RECEIVER IF TRAP USING A BIFILAR WINDING

Filed Nov. 19, 1962

Inventor:
Herman F. Irelan
By Hofgren, Brady, Wegner, Allen & Stellman
Attorneys.

United States Patent Office 3,201,698
Patented Aug. 17, 1965

3,201,698
RECEIVER IF TRAP USING A BIFILAR WINDING
Herman Frederick Irelan, Bartlett, Ill., assignor to Oak Manufacturing Co.
Filed Nov. 19, 1962, Ser. No. 238,620
2 Claims. (Cl. 325—477)

This invention relates to a filter circuit and more specifically to a high frequency series resonant trap for use in electronic circuits. Although this invention has broad application, it will be discussed herein in conjunction with a frequency modulation radio receiver.

Modern day radio receiving sets are generally of the type known as superheterodyne receivers. In these sets a received radio signal is mixed with a locally generated signal and the difference frequency is supplied to an amplifier stage which is specifically designed to efficiently amplify that particular difference or intermediate frequency. This type of receiver has very good amplifying characteristics and has had wide acceptance.

However, since the receiver is designed to amplify a specific frequency to a high degree, receipt of any interferring signals at that specific frequency raises a particularly serious problem since such spurious signals will also be amplified and produce interference in the output. Therefore, it has been the practice to provide trap circuits ahead of the mixer to eliminate such unwanted signals.

It is an object of this invention to provide an improved trap circuit for eliminating unwanted signals at the intermediate frequency. It is a further object of this invention to provide such a trap circuit which is inexpensive, has few components and requires little space.

Accordingly, it is a feature of this invention to provide a series resonant trap circuit utilizing a bifilar wound coil. More specifically, the two portions of the coil are connected in series across the signal channel of the receiver, the self and mutual inductance adding to provide the trap inductance, and the distributed capacity between windings resonating with the inductance, at the intermediate frequency.

It is another feature of the invention to provide a series resonant circuit physically supported upon another component of the receiver.

Further features and advantages will become apparent from the following detailed description taken in connection with the accompanying drawings in which.

Figure 1:
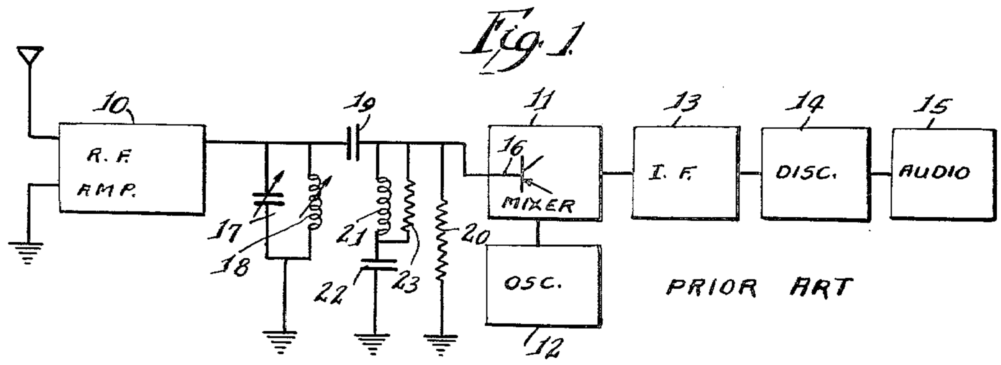
FIGURE 1 is a circuit, partially in block form, of a frequency modulation receiver having a trap circuit of the prior art.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

As illustrated in FIGURE 1, a frequency modulation receiver may include an intermediate frequency (IF) amplifier 13, a discriminator 14 and an audio output stage 15. The mixer 11 shown in the drawing includes a transistor 16 having its base electrode coupled to receive signals from the RF amplifier 10. Coupled to the signal channel between the radio frequency amplifier 10 and mixer 11 is a tuned circuit including a variable capacitor 17 and a variable inductor 18. A capacitor 19 couples the received signal to the base circuit of the transistor which includes a biasing resistor 20. An intermediate frequency trap circuit comprising coil 21 and capacitor 22, series tuned to the frequency of the intermediate frequency amplifier 13, is connected in shunt with the signal channel between capacitor 19 and mixer transistor 16. Resistor 23 is connected in parallel with inductor 21 to establish a desired Q for the circuit.

Figure 2:
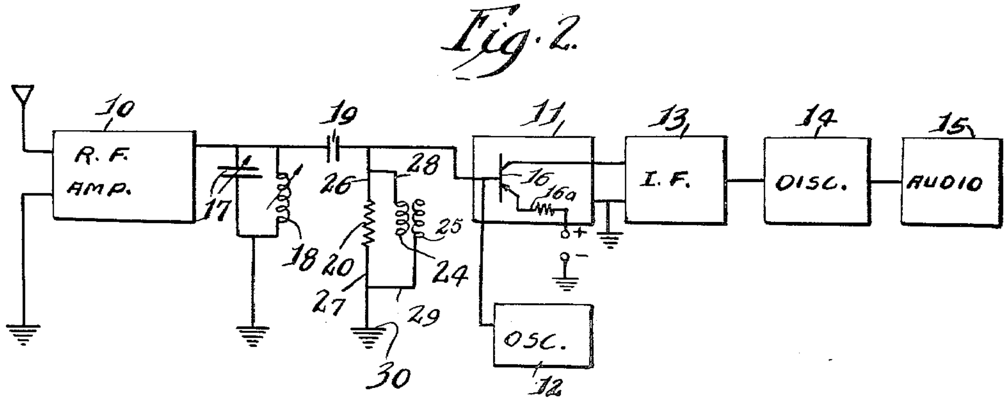
FIGURE 2 is a similar circuit illustrating an embodiment of the invention.

FIGURE 2, showing an embodiment of the invention, has the same general components of FIGURE 1. The intermediate frequency trap circuit includes a pair of windings 24 and 25 bifilarly wound and connected in series across the signal channel, as from the input or base of mixer transistor 16 to a reference potential or ground 30. A first end or lead 28 of winding 24 is connected with the signal channel while the opposite end or lead 29 of winding 25 is connected with ground. This connection places the self and mutual inductances of the windings in series. Mixer transistor 16 is connected through resistor 16*a* with a source of positive operating potential which is returned to ground. The bifilar wound coils 24 and 25 have very close coupling therebetween which provides distributed capacity to resonate in series with the inductance of the windings at the intermediate frequency of the receiver, across the mixer input. The resistance of the two coils is selected so that a proper Q is secured for the series resonant circuit.

Figure 3:
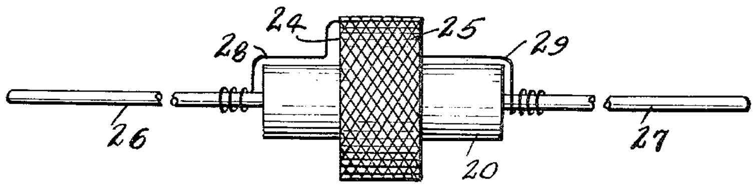
FIGURE 3 is an elevation of a physical embodiment of the trap circuit.

The circuit is further simplified by forming the windings on bias resistor 20. Details of this construction are shown in FIGURE 3 wherein resistor 20 is shown as a cylindrical member having leads 26 and 27 extending axially therefrom. The leads 28 and 29 make contact with the resistor leads 26 and 27 and are soldered together to provide a good electrical contact. Thus, there is provided a novel circuit for elimination of the undesired received signals. Capacitor 22 and resistor 23 of FIGURE 1 have been eliminated simplifying the construction of the trap circuit. In addition, the structure has the advantage of providing a stable physical mounting for the trap circuit.

In a specific embodiment of the invention, for a frequency modulation receiver having an intermediate frequency of 10.7 megacycles, the trap circuit has 49 turns of #40 bifilar wire. It is wound on and connected in parallel with an 18,000 ohm, ¼ watt resistor.

I claim:

1. In a radio signal receiver having a signal channel including a transistor mixer stage, and an elongated cylindrical bias resistor for said mixer, said resistor having two terminals and being connected between the signal channel and a reference potential, a filter circuit, comprising: a pair of bifilar windings wound on said bias resistor and one end of each winding connected with a different terminal thereof while the other end of each winding is left unconnected, the distributed capacity between said windings series resonating with the effective inductance thereof to form a series resonant circuit at the frequency to be filtered.

2. In a radio signal receiver, signal handling filter circuit means including: means establishing a signal handling channel having a signal conductor and a reference conductor, said channel including a generally cylindrical circuit element having two terminals and shunt connected across said channel, one of said terminals being connected with each of said signal channel conductors; and a filter comprising a pair of bifilar windings mounted on said circuit element, each winding having corresponding first and second ends, one of said windings having its first end connected with one of the terminals of said circuit element and its second end unconnected, the other winding having its first end unconnected and its second end connected with the other terminal of said circuit element, the distributed capacity between said windings resonating with the effective inductance thereof forming a series resonant network at the frequency to be filtered.

References Cited by the Examiner

UNITED STATES PATENTS

| | | | |
|---|---|---|---|
| 1,757,333 | 5/30 | Ranger | 325—477 |
| 2,368,857 | 2/45 | McClellan | 333—76 |
| 3,114,889 | 12/63 | Avins | 333—76 |

DAVID G. REDINBAUGH, *Primary Examiner*.